(12) United States Patent
Elshafie et al.

(10) Patent No.: US 12,238,758 B2
(45) Date of Patent: Feb. 25, 2025

(54) METHODS AND SYSTEMS FOR ALIGNING TRANSMISSIONS FOR INTRA-BAND CARRIER AGGREGATION IN SIDELINK COMMUNICATIONS

(71) Applicant: QUALCOMM Incorporated, San Diego, CA (US)

(72) Inventors: Ahmed Elshafie, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/703,784

(22) Filed: Mar. 24, 2022

(65) Prior Publication Data

US 2023/0309140 A1    Sep. 28, 2023

(51) Int. Cl.
| | |
|---|---|
| *H04W 72/566* | (2023.01) |
| *H04L 5/00* | (2006.01) |
| *H04W 72/1263* | (2023.01) |
| *H04W 72/20* | (2023.01) |
| *H04W 92/18* | (2009.01) |

(52) U.S. Cl.
CPC ......... *H04W 72/566* (2023.01); *H04L 5/0037* (2013.01); *H04W 72/1263* (2013.01); *H04W 72/20* (2023.01); *H04W 92/18* (2013.01)

(58) Field of Classification Search
CPC ......... H04W 72/0453; H04W 72/1263; H04W 72/20; H04W 72/566; H04W 72/25; H04W 92/18; H04W 72/569; H04W 72/51; H04L 5/001; H04L 5/0037; H04L 5/0044

See application file for complete search history.

(56) References Cited

U.S. PATENT DOCUMENTS

| | | | | |
|---|---|---|---|---|
| 10,887,736 | B2* | 1/2021 | Lee ....................... | H04W 72/02 |
| 2019/0141647 | A1* | 5/2019 | Nimbalker ........... | H04L 5/0048 |
| 2019/0246377 | A1* | 8/2019 | Zhou .................... | H04W 76/23 |
| 2020/0059844 | A1* | 2/2020 | Lee ...................... | H04W 36/302 |
| 2020/0163005 | A1* | 5/2020 | Rao ...................... | H04W 4/40 |
| 2022/0191912 | A1* | 6/2022 | Liu ...................... | H04W 72/23 |

\* cited by examiner

*Primary Examiner* — Brian D Nguyen
(74) *Attorney, Agent, or Firm* — Arent Fox, LLP

(57) ABSTRACT

A user equipment may be configured to implement a procedure for aligning transmissions for intra-band carrier aggregation in sidelink communications. In some aspects, a user equipment may send one or more first transmissions to a second UE via a first sidelink component carrier, a first transmission of the one or more first transmissions including first user data. Further, the user equipment may send one or more second transmissions to a third UE via a second sidelink component carrier, the one or more first transmissions aligned with the one or more second transmissions and a second transmission of the one or more second transmissions including second user data and a repetition of a portion of the second user data.

30 Claims, 10 Drawing Sheets

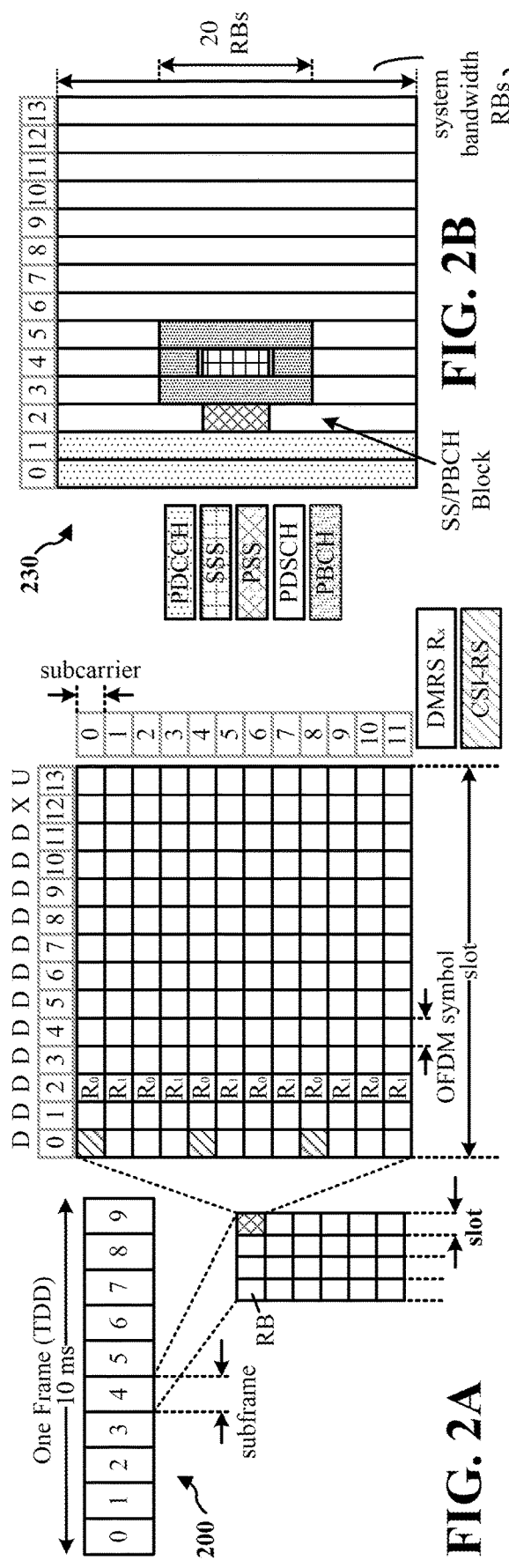
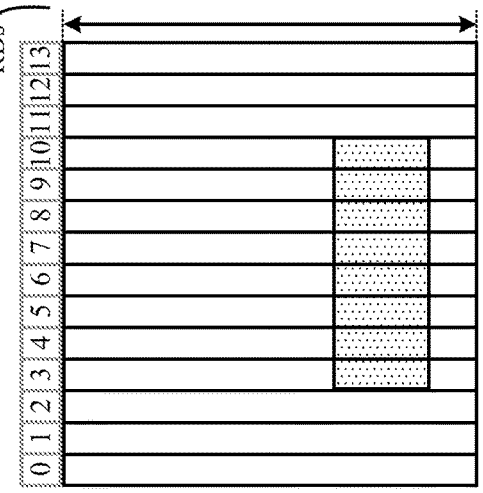
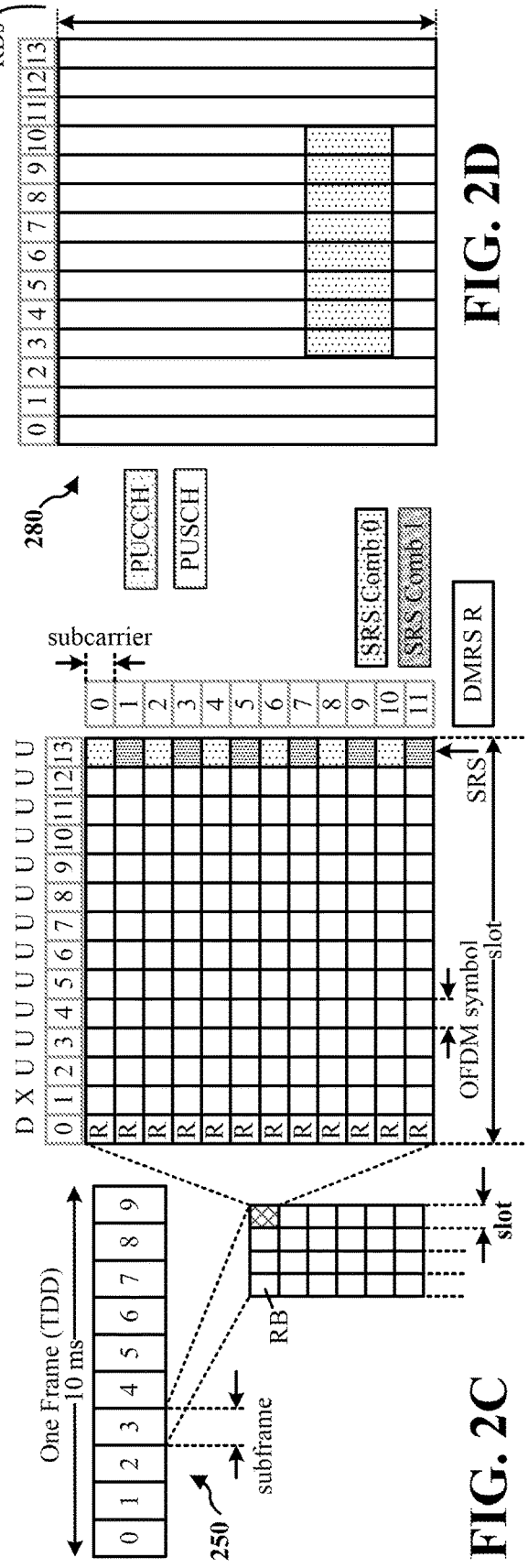
FIG. 2A   FIG. 2B   FIG. 2C   FIG. 2D

1100

```
┌─────────────────────────────────────────────────────────────────┐
│  Receiving, from a second UE, a sidelink repetition indication  │
│  to the UE, the sidelink repetition indication scheduling       │
│  transmission of repetition information within one or more      │
│  first transmissions                                            │
│                            1110                                 │
└─────────────────────────────────────────────────────────────────┘
                                │
                                ▼
┌─────────────────────────────────────────────────────────────────┐
│  Receiving, from the second UE, the one or more first           │
│  transmissions via a sidelink component carrier, the one or     │
│  more first transmissions aligned with the one or more second   │
│  transmissions by the second UE to a third UE, and a first      │
│  transmission of the one or more first transmissions including  │
│  first user data and a repetition of a portion of the first     │
│  user data                                                      │
│                            1120                                 │
└─────────────────────────────────────────────────────────────────┘
```

FIG. 11

METHODS AND SYSTEMS FOR ALIGNING TRANSMISSIONS FOR INTRA-BAND CARRIER AGGREGATION IN SIDELINK COMMUNICATIONS

BACKGROUND

Technical Field

The present disclosure relates generally to wireless communication, and more particularly, implementing a procedure for aligning transmissions for intra-band carrier aggregation in sidelink communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a first user equipment (UE) comprising sending one or more first transmissions to a second UE via a first sidelink component carrier, a first transmission of the one or more first transmissions including first user data; and sending one or more second transmissions to a third UE via a second sidelink component carrier, the one or more first transmissions aligned with the one or more second transmissions and a second transmission of the one or more second transmissions including second user data and a repetition of a portion of the second user data.

The disclosure also provides a first device (e.g., a UE) including a memory storing computer-executable instructions and at least one processor configured to execute the computer-executable instructions to send one or more first transmissions to a second UE via a first sidelink component carrier, a first transmission of the one or more first transmissions including first user data; and send one or more second transmissions to a third UE via a second sidelink component carrier, the one or more first transmissions aligned with the one or more second transmissions and a second transmission of the one or more second transmissions including second user data and a repetition of a portion of the second user data. In addition, the disclosure also provides an apparatus including means for performing the above method, and a non-transitory computer-readable medium storing computer-executable instructions for performing the above method.

An example implementation includes a method of wireless communication at a first UE comprising receiving, from a second UE, a sidelink repetition indication to the UE, the sidelink repetition indication scheduling transmission of repetition information within one or more first transmissions; and receiving, from the second UE, the one or more first transmissions via a sidelink component carrier, the one or more first transmissions aligned with the one or more second transmissions by the second UE to a third UE, and a first transmission of the one or more first transmissions including first user data and a repetition of a portion of the first user data.

The disclosure also provides a first UE including a memory storing computer-executable instructions and at least one processor configured to execute the computer-executable instructions to receiving, from a second UE, a sidelink repetition indication to the UE, the sidelink repetition indication scheduling transmission of repetition information within one or more first transmissions; and receiving, from the second UE, the one or more first transmissions via a sidelink component carrier, the one or more first transmissions aligned with the one or more second transmissions by the second UE to a third UE, and a first transmission of the one or more first transmissions including first user data and a repetition of a portion of the first user data. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

FIG. 11 is a flowchart of a second example method of aligning transmissions for intra-band carrier aggregation in sidelink communications, in accordance with some aspects of the present disclosure.

DETAILED DESCRIPTION

Figure 1:
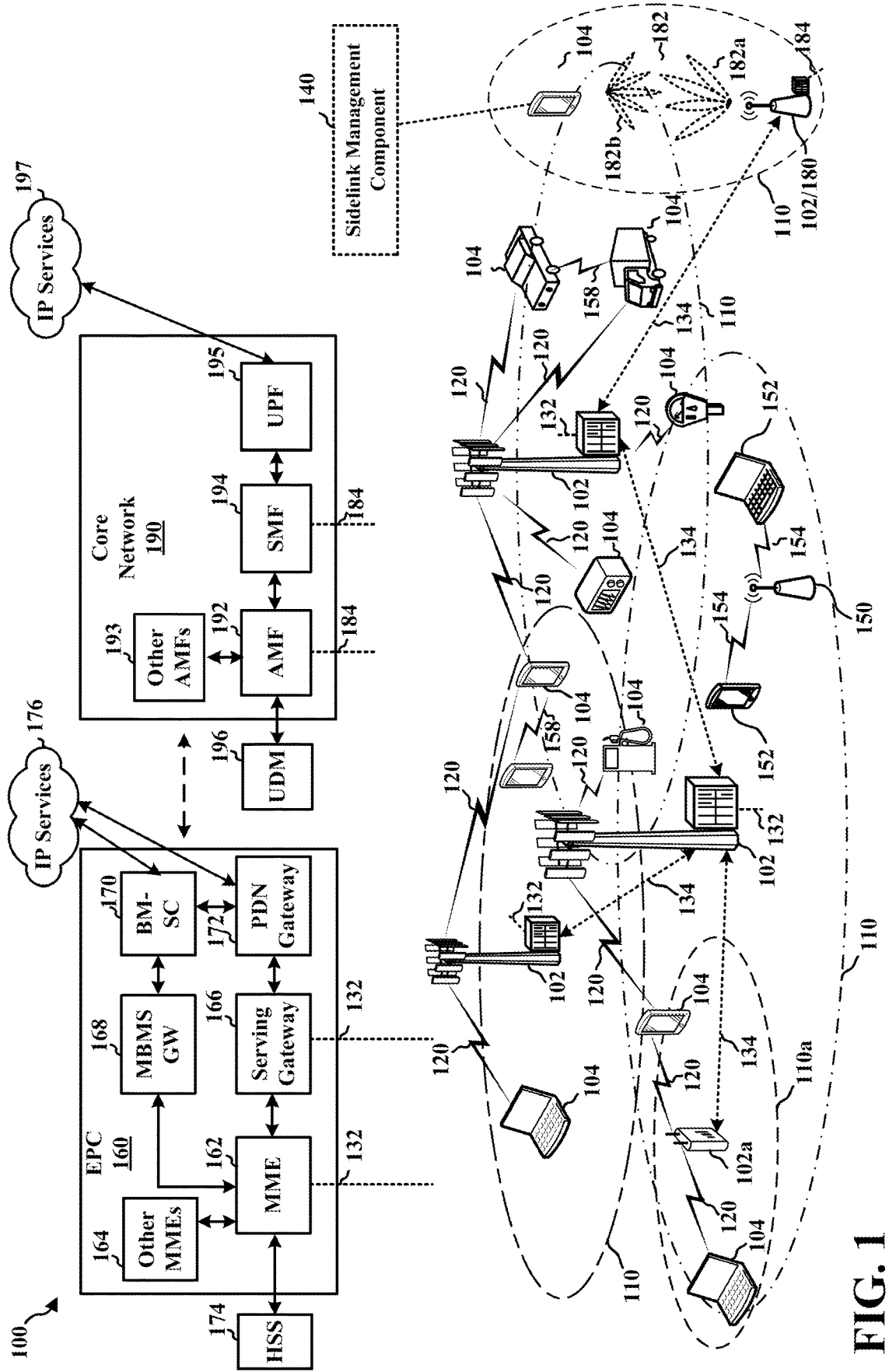
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for transmit alignments for intra-band carrier aggregation in sidelink communications. Carrier aggregation is a technique that is used in wireless communication to increase the data rate per user, whereby multiple frequency blocks (called component carriers) are assigned to the same device (e.g., user equipment). Further, carrier aggregation also increases the sum data rate of a cell because of better resource utilization. As described herein, "sidelink communications" may refer to communication directly between devices without the network. Currently, 5G NR sidelink does not support carrier aggregation. Additionally, in order to enable carrier aggregation for 5G NR sidelink communications, a system designer has to account for 5G NR sidelink communications employing hybrid automatic repeat request (HARQ). 5G NR sidelink provides a physical sidelink feedback channel (PSFCH) that is transmitted by a sidelink receiving UE for unicast and groupcast, which conveys information for the HARQ acknowledgement (ACK) and/or the negative ACK (NACK). In 5G NR, the PSFCH configuration may vary among component carriers. As a result, different component carriers may transmit data using a different number of symbols, which may result in phase incontinuity due to transmission misalignment between the data. As such, in some aspects, a UE may be configured to inexpensively align transmissions for intra-band carrier aggregation in sidelink communications. As described in detail herein, a transmitting UE may align transmissions across two different CCs from a Tx-UE by reducing the number of symbols of a first transmission that does not have PSFCH to be equal to that of a transmission having PSFCH, and repeating a portion of the data that has been reduced on a component carrier during transmission of the PSFCH on another component carrier. Accordingly, in some aspects, a UE may be configured to improve reliability and reduce inefficient use of time and frequency resources, while enhancing throughput by enabling carrier aggregation for sidelink communication.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a sidelink device (e.g., a UE 104) may include a sidelink management component 140 configured to align sidelink transmissions across two different CCs and employ unused symbols of one of the CCs for data transmission, e.g., the sidelink management component 140 may direct the UE 104 to transmit redundant data over the unused symbols.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and 2μ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 ρs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
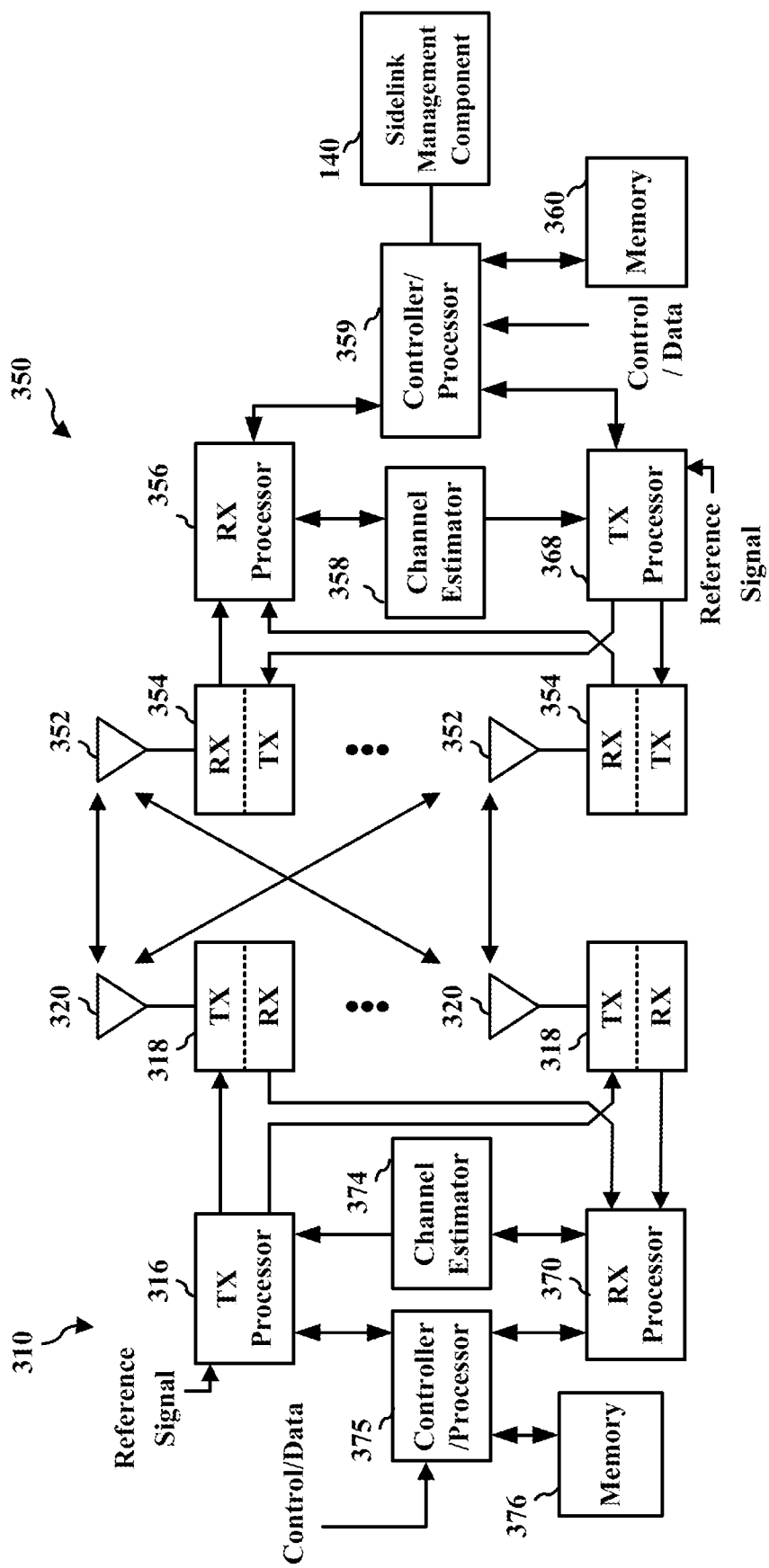
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the sidelink management component 140 of FIG. 1.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
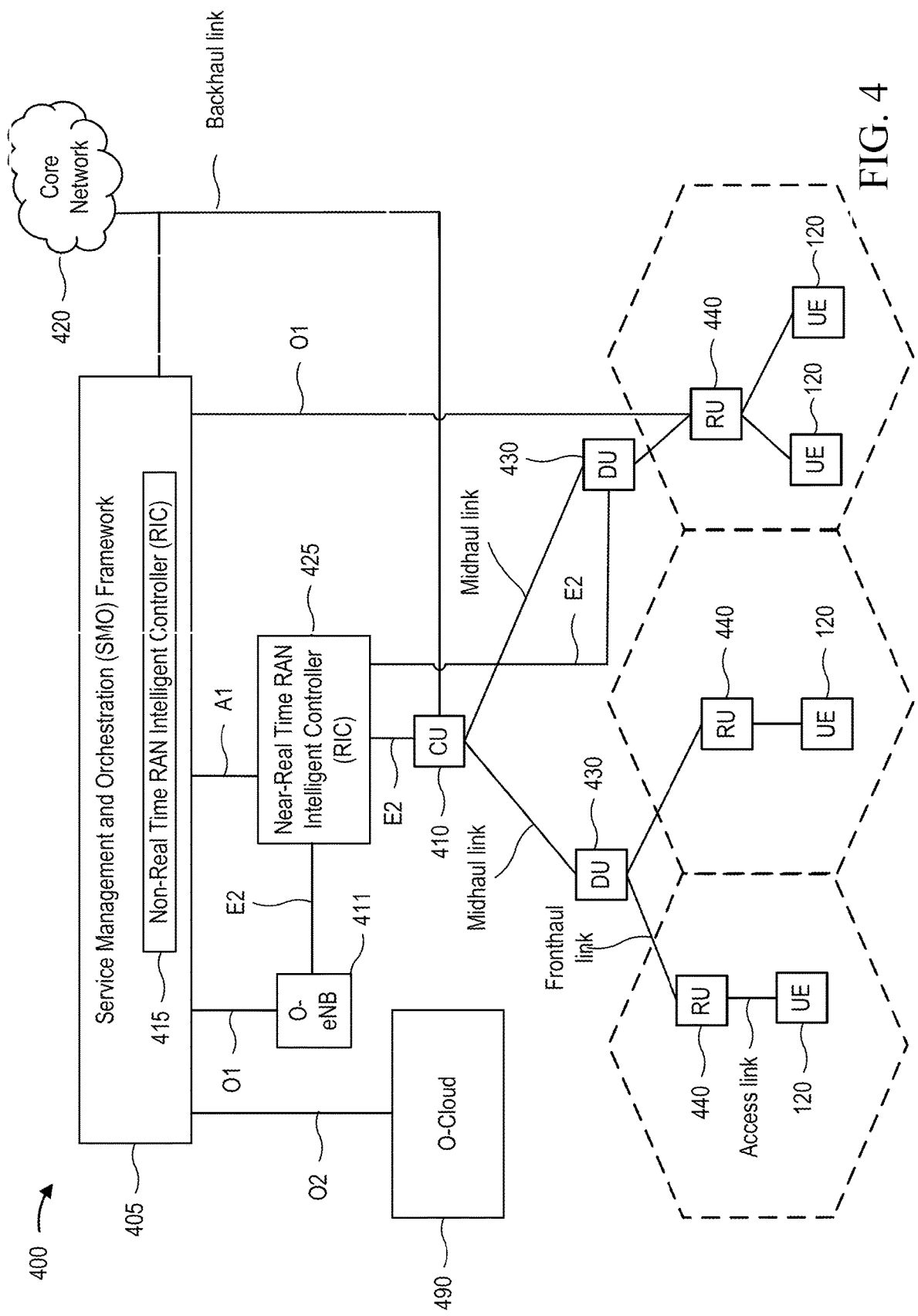
FIG. 4 is a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (MC) 425 via an E2 link, or a Non-Real Time (Non-RT) MC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425.

The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT MC 425.

In some implementations, to generate AI/ML models to be deployed in the Near-RT MC 425, the Non-RT MC 415 may receive parameters or external enrichment information from external servers. Such information may be utilized by the Near-RT MC 425 and may be received at the SMO Framework 405 or the Non-RT MC 415 from non-network data sources or from network functions. In some examples, the Non-RT RIC 415 or the Near-RT MC 425 may be configured to tune RAN behavior or performance. For example, the Non-RT MC 415 may monitor long-term trends and patterns for performance and employ AI/ML models to perform corrective actions through the SMO Framework 405 (such as reconfiguration via O1) or via creation of RAN management policies (such as A1 policies).

Referring to FIGS. 5-11, in one non-limiting aspect, a system 500 configured to aligning transmissions for intra-band carrier aggregation in sidelink communications, in accordance with some aspects of the present disclosure.

Figure 5:
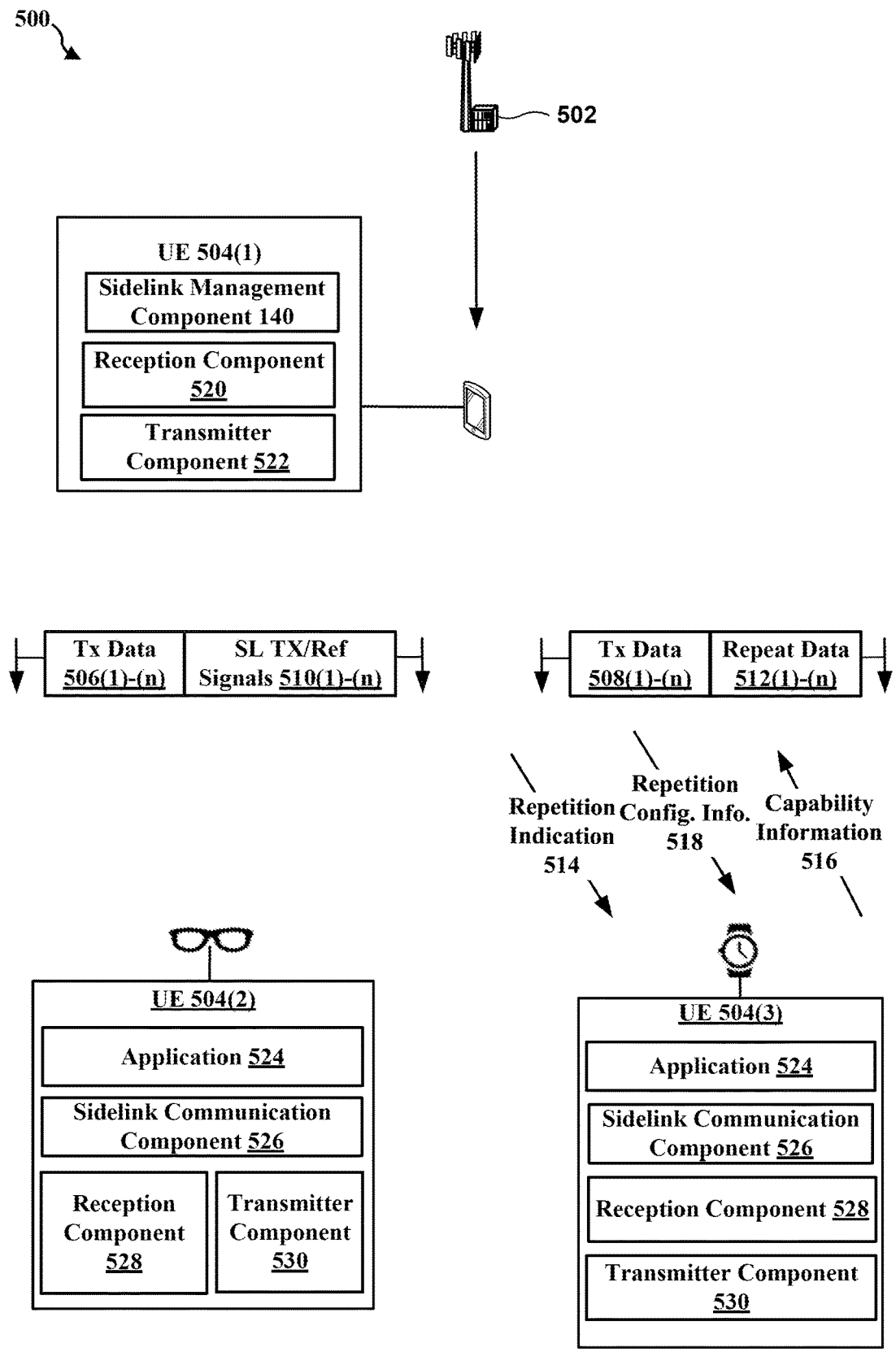
FIG. 5 is a diagram illustrating example communications and components of network entities and UEs.

FIG. 5 is a diagram illustrating example communications and components of network entities and UEs. As illustrated in FIG. 5, the system 500 may include at least one network entity 502 (e.g., the base station 102/180) and a plurality of UEs 504(1)-(n) (e.g., the UEs 104). Further, in some aspects, the network entity may serve at least a first UE 504(1) (e.g., the UE 104). Additionally, the UEs 504(1)-(n) may communicate with each other over via a sidelink. For example, the UE 504(1) may be a primary UE or a relay UE in communication with UE 504(2) and 504(3). In some aspects, the sidelink communications may be beamformed wireless communications whereby the UE 504(1) transmits and receives data via a sidelink with UE 504(2) and 504(3). Further, as described in detail herein, UE 504(1) may contemporaneously transmit and receive data from the UE 504(2) and 504(3) via sidelink communications.

In some aspects, each of the UEs 504 may be configured with multiple transmit resource pools and multiple receive resource pools. As used herein, in some aspects, a "resource pool" may refer a plurality of resources (e.g., time and frequency resources) that may be used by the UEs for transmissions and receptions over the sidelink. In some aspects, a resource pool may include contiguous PRBs and contiguous or non-contiguous slots that have been configured for SL transmissions. Further, a resource pool may be defined by one or more bandwidth parts. A bandwidth part (BWP) is subset of contiguous RBs on a carrier.

Further, the sidelink may include a physical sidelink shared channel (PSSCH), a physical sidelink control channel (PSCCH), and a physical sidelink feedback channel (PSFCH). NR sidelink transmissions may include broadcast transmissions, unicast transmissions, and groupcast transmission. In unicast transmissions, the transmitting UE has a single receiver UE as a recipient. Groupcast transmissions are employed when the transmitting UE endeavors to communicate with more than one UE, but only a specific sub-set of the UEs in the vicinity of the transmitting UE. Broadcast transmissions enable a UE to communicate with all UEs within a transmission range of the transmitting UE. The PSSCH may be transmitted by a sidelink transmitting UE, which conveys sidelink transmission data, system information blocks (SIBs) for radio resource control (RRC) configuration, and a part of sidelink control information (SCI). The PSCCH may carry the SCI, which may include information about the resource allocation of the PSSCH. The PSFCH may be transmitted by a sidelink receiving UE for unicast and groupcast transmissions. Further, the PSFCH may be used to transmit HARQ feedback from a receiver UE to a transmitter UE on the SL for a unicast or groupcast communication.

As illustrated in FIG. 5, the UE 504(1) may include a sidelink management component 140 configured to align sidelink transmissions across two different CCs and use unused symbols of one of the CCs for data transmission. For example, a first CC may be employed to transmit first transmit data 506(1)-(n) from the UE 504(1) to the UE 504(2) and a second CC may be employed to transmit second transmit data 508(1)-(n) from the UE 504(1) to the UE 504(3). Further, the first CC may include one or more other resources, e.g., feedback resources. As illustrated in the FIG. 5, the one or more other resources may be SL transmissions/reference signals 510(1)-(n). Some examples of the SL transmissions/reference signals 510(1)-(n) include a PSFCH, sidelink channel state information reference signals, sidelink positioning reference signals, a phase tracking reference signal, a TRS, etc.

For example, the UE 504(1) may transmit the first transmit data 506(1) and a PSFCH within a first slot of the first CC. Further, the sidelink management component 140 may be configured to align the second transmit data 508(1) of a first slot of the second CC with the first transmit data 506(1). In particular, if the size of the second transmit data 508(1) is greater than the first transmit data 506(1), the sidelink management component 140 may be configured to reduce the size of the second transmit data 508(1) to equal the size of the first transmit data 506(1). In some aspects, the size of the first transmit data 506(1) and the second transmit data 510(1) may correspond to the amount of symbols of a slot consumed by the first transmit data 506(1) and the second transmit data 508(1). In some aspects, the first transmit data 506(1) may be transmitted using ten symbols of the fourteen symbols of the first slot of the first CC and the PSFCH may be transmitted using two symbols of the fourteen symbols of the first slot of the first CC. Further, in order to avoid wasting three symbols of the first slot of the second CC after trimming the second transmit data 508(1), the sidelink management component 140 may be configured to repeat a portion of the second transmit data 508(1) within the unused symbols of the first slot of the second CC. For example, the sidelink management component 140 may be configured to transmit the second transmit data 508(1) and the repeat data 512(1) within the first slot of the second CC.

In some aspects, the repeat data 512(1) may include a portion of the sidelink control information 1 (SCI-1) symbols and a portion of the physical sidelink shared channel (PSSCH) of the first slot of the second CC. Further, if the repeat data 512(1) includes SCI-1, then the UE 504(3) can use the repeat data 512(1) to determine the sensing results and for decoding the second transmit data 508(1). In some other aspects, the repeat data 512(1) may include a portion of the second transmit data 508(1) and/or sidelink control information (SCI) 2. In addition, in some aspects, the sidelink management component 140 may transmit an indication of the contents of the repeat data 512(1) within the first slot.

Once the sidelink management component 140 determines to include repeat data 512 in the second CC, the sidelink management component 140 may transmit a repeat data indication 514 to the third UE 504(3). In some aspects, the repeat data indication 514 may be transmitted using RRC or MAC-CE. Further, if the repeat data indication 514 is transmitted using RRC or MAC-CE, the sidelink management component 140 may indicate cancelation of transmission of repeat data 512 in SCI. Alternatively, in some aspects, explicit indication may not be needed when the repeat data 512 is transmitted within a slot. For example, if the UE 504(3) has previously received a RRC/MAC-CE indicating that repeat data 512 is included in the second CC, reception of any SCI-1 from the UE 504(1) will indicate that there is repetition when there is a transport block (second transmit data 508) within a PSSCH, which can be determined by decoding the SCI-1. In addition, energy detection of DMRS of PSCCH or PSSCH (or both combined) can give sense if there is repeat data 512 included in a slot of the second CC.

In some aspects, the sidelink management component 140 may determine whether to include repeat data 512 in the second CC based on attributes of the UE 504(3). For example, the sidelink management component 140 may receive capability information 516 from the UE 504(3). The capability information 516 may include battery capabilities or computational capabilities of the UE 504(3). For example, the sidelink management component 140 may determine to implement data repetition over the second CC based on the capability information 516 and transmit a repeat data indication 514 to the UE 504(3) indicating that the UE 504(1) will include the repeat data 512 with the second transmit data 508. In some aspects, the repeat data indication 514 may be configured using RRC or MAC-CE.

In some aspects, the sidelink management component 140 may determine whether a SL transmissions/reference signal 510 should be included in a slot based upon an earlier slot. In some aspects, if the sidelink management component 140 determines that a SL transmission/reference signal 510 should be included in a slot, the sidelink management component 140 may include the SL transmission/reference signal 510 in two symbols (e.g., the 11$^{th}$ and 12$^{th}$ symbols) of the fourteen symbols of the first slot of the first CC and include the repeat data 512 in two non-overlapping symbols (e.g., 10$^{th}$ and 13$^{th}$ symbols) of the first slot of the second CC. In some other aspects, the sidelink management component 140 may determine not to include the repeat data 512 in the first slot of the second CC.

In yet still some other aspects, the sidelink management component 140 may determine not to include SL transmission/reference signal 510 in the first slot of the first CC and include the repeat data 512 in the three symbols following the physical sidelink shared channel (PSSCH) (e.g., the 10$^{th}$, 11$^{th}$ and 12$^{th}$ symbols) of the fourteen symbols of the first slot of the second CCI. In some aspects, the sidelink management component 140 may cancel transmission of the SL transmission/reference signal 510 within the first slot based at least in part on a priority of second transmit data 508(1) or a priority of the SL transmission/reference signal 510(1). In addition, the sidelink management component 140 may indicate whether the repeat data 512(1) was transmitted in two slots, three slots, or no slots within SCI of the first slots of the first and second CCs to the UE 504(2) and 504(3), respectively. If a semi-static method is used to activate data repetition, then UE 504(3) may determine that PSFCH is canceled through observing no signal on PRB associated with transmissions from UE 504(1).

Alternatively, in some aspects, if the sidelink management component 140 determines that a SL transmission/reference signal 510 should not be included in a slot based on an earlier slot (e.g., two slots ahead), the sidelink management component 140 may include the repeat data 512 in the three symbols following the physical sidelink shared channel (PSSCH) (e.g., the 10th, 11$^{th}$ and 12$^{th}$ symbols) of the fourteen symbols of the first slot of the second CC. In some other aspects, the sidelink management component 140 may determine not to transmit the repeat data within a slot of the second CC. In addition, the sidelink management component 140 may indicate whether the repeat data 512(1) was transmitted in two slots, three slots, or no slots within SCI-2 of the first slots of the first and second CCs to the UE 504(2) and 504(3), respectively. Further, if repetition feature is semi-statically (RRC) or MAC-CE configured, the sidelink management component 140 can cancel transmission of the repeat data 512 and indicate cancelation to the UE 504(3) through SCI-2.

In some aspects, if the UE 504(3) is not capable of simultaneous reception and transmission, the sidelink management component 140 may determine whether to transmit repeat data 512 or receive data on a physical sidelink feedback channel (PSFCH) within the first slot of the second CC. Further, the sidelink management component 140 may determine whether to transmit repeat data 512 or receive data on a PSFCH within the first slot of the second CC based on comparing a priority of the SL transmissions/reference signal 510(1) (PSFCH) to a priority of the PSSCH.

In some aspects, the sidelink management component 140 may transmit a redundancy value for the repeat data 512(2) of a second slot of the second CC within the SCI of the first slot. In some other aspects, the sidelink management component 140 may generate repetition configuration information 518 that includes mapping information that may be used by the third UE 504(3) to determine the redundancy value of a slot based on the redundancy value of an earlier slot. Further, the repetition configuration information 518 may be transmitted semi-statically using RRC or using MAC-CE. Alternatively, the repetition configuration information 518 may be stored at the UEs 504(2)-(3).

In addition, the UE 504(1) may include a reception component 520 and a transmitter component 522. The transmitter component 522 may be configured to generate signals for transmission operations as described herein. The transmitter component 522 may include, for example, a RF transmitter for transmitting the signals described herein. The reception component 520 may include, for example, a RF receiver for receiving the signals described herein. In an aspect, the reception component 520 and the transmitter component 522 may be co-located in a transceiver (e.g., the transceiver 910 shown in FIG. 9).

As illustrated in FIG. 5, the UE 504(2) may include an application 524 and a sidelink communication component 526. The application 524 may perform one or more tasks on the UE 504(2). Further, the sidelink communication component 526 may be configured to perform sidelink communications. In addition, the UE 504(2) may include a reception component 528 and a transmitter component 530. The transmitter component 530 may be configured to generate signals for transmission operations as described herein. The transmitter component 530 may include, for example, a RF transmitter for transmitting the signals described herein. The reception component 528 may include, for example, a RF receiver for receiving the signals described herein. In an aspect, the reception component 528 and the transmitter component 530 may be co-located in a transceiver (e.g., the transceiver 910 shown in FIG. 9).

As illustrated in FIG. 5, the UE 504(3) may include an application 524 and a sidelink communication component

526. The application 524 may perform one or more tasks on the UE 504(2). Further, the sidelink communication component 526 may be configured to perform sidelink communications. Further, the sidelink communication component 526 may receive the repeat data indication 514, and utilize the repeat data 512 based at least in part on receipt of the repeat data indication 514. In addition, the UE 504(3) may include a reception component 528 and a transmitter component 530. The transmitter component 530 may be configured to generate signals for transmission operations as described herein. The transmitter component 530 may include, for example, a RF transmitter for transmitting the signals described herein. The reception component 528 may include, for example, a RF receiver for receiving the signals described herein. In an aspect, the reception component 528 and the transmitter component 530 may be co-located in a transceiver (e.g., the transceiver 910 shown in FIG. 9).

Figure 6:
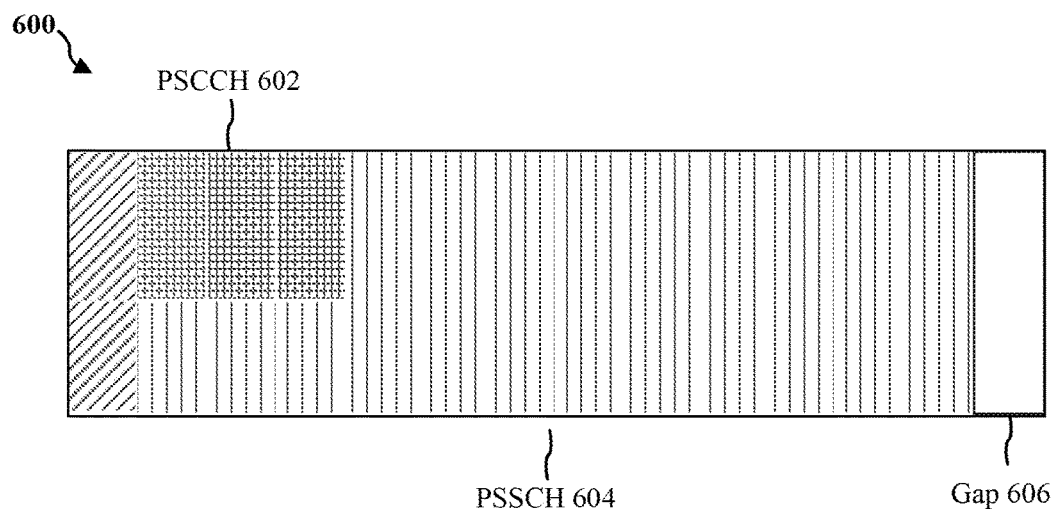
FIG. 6 is a diagram illustrating an example of a PSCCH/PSSCH slot, in accordance with some aspects of the present disclosure.

FIG. 6 is a diagram illustrating an example of a PSCCH/PSSCH slot, in accordance with some aspects of the present disclosure. As illustrated in FIG. 6, a PSCCH/PSSCH slot 600 may include fourteen sidelink symbols 602 ($0^{th}$ to $13^{th}$ symbols). The $1^{st}$ thru $3^{rd}$ third symbols may include the PSSCH 604. The $1^{st}$ thru $12^{th}$ symbols may include the PSSCH 606, and the $13^{th}$ symbol may include a gap 608.

Figure 7:
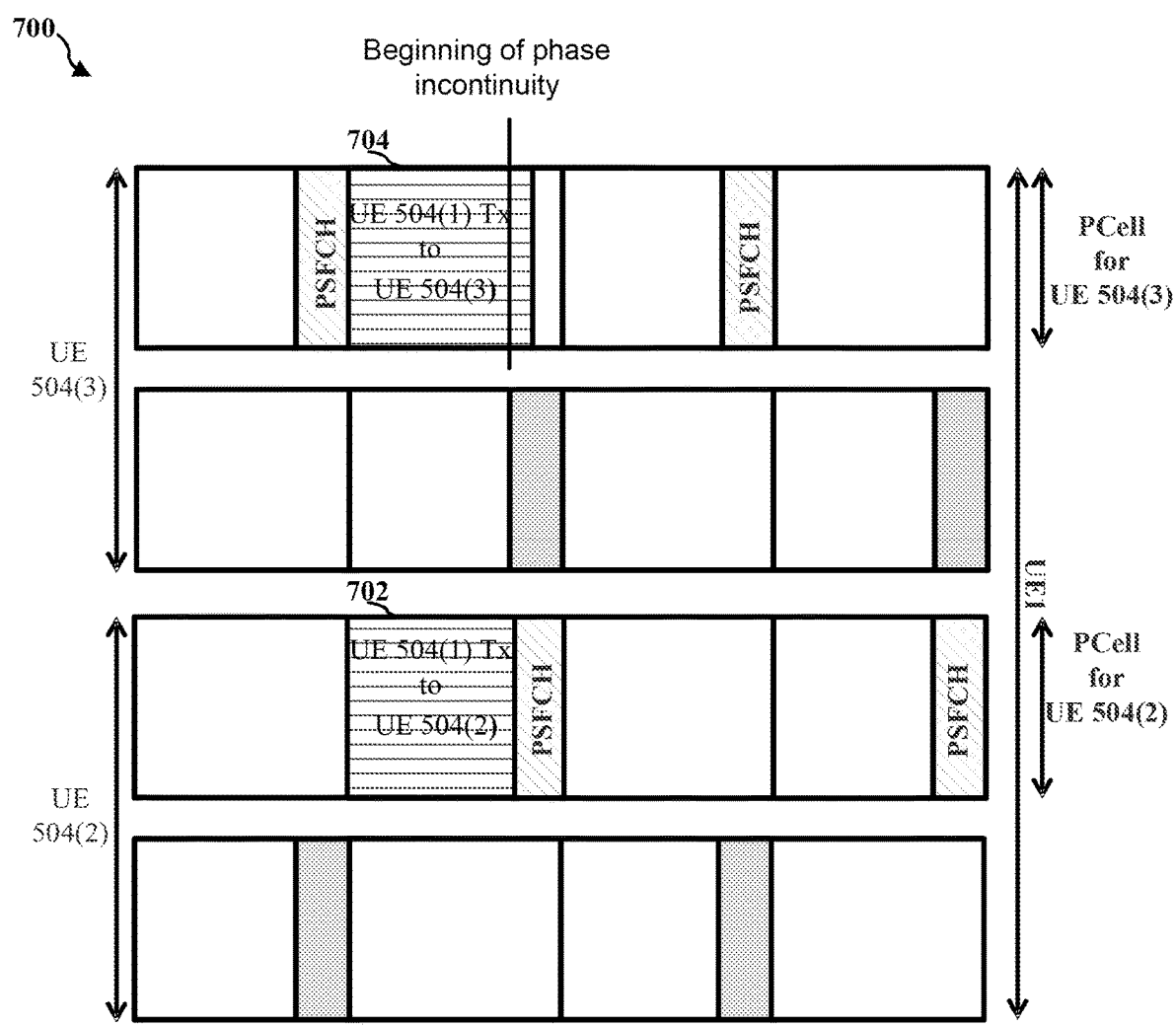
FIG. 7 is a diagram illustrating an example of phase incontinuity, in accordance with some aspects of the present disclosure.

FIG. 7 is a diagram 700 illustrating an example of phase incontinuity, in accordance with some aspects of the present disclosure. As illustrated in FIG. 7, the UE 504(1) may transmit user data and the PSFCH in a first slot 702 to the UE 504(2) and user data in a second slot 704 to the UE 504(3). In FIG. 7, the user data transmitted to the UE 504(3) is unaligned with the user data transmitted to the UE 504(2) given that the user data transmitted to the UE 504(3) uses symbols past the 10th symbol. As described herein, phase incontinuity may result, which can negatively affect sidelink communications between the UE 504(1) and the UEs 504(2) and 504(3). Accordingly, the user data transmitted to the UE 504(3) will be trimmed to align the transmissions to the UE 504(2) and UE 504(3). Further, as described in detail herein, repeat data may be transmitted to the UE 504(3) for efficiency and improved reliability.

Figure 8A:
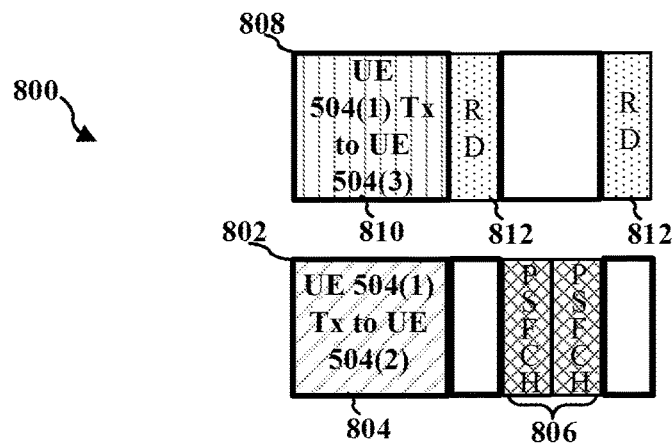
FIG. 8A is a diagram illustrating a first example position of the repeat data and/or PSFCH, in accordance with some aspects of the present disclosure.

FIG. 8A is a diagram 800 illustrating a first example position of the repeat data and/or PSFCH, in accordance with some aspects of the present disclosure. As illustrated in FIG. 8A, a first slot 802 on the first CC may include transmit data 804 and the PSFCH 806. Further, a second slot 808 may include transmit data 810 and repeat data 812. Further as illustrated in FIG. 8A, the repeat data 812 may be transmitted in symbols that do not overlap with the symbols used to transmit the PSFCH 806.

Figure 8B:
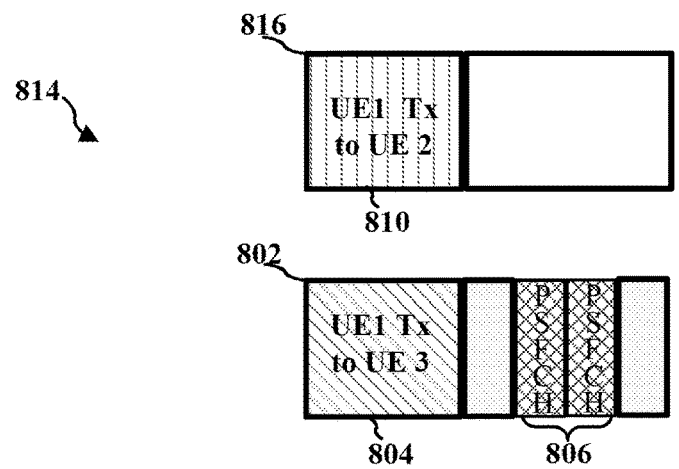
FIG. 8B is a diagram illustrating a second example position of the repeat data and/or PSFCH, in accordance with some aspects of the present disclosure.

FIG. 8B is a diagram 814 illustrating a second example position of the repeat data and/or PSFCH, in accordance with some aspects of the present disclosure. As illustrated in FIG. 8B, the first slot 802 on the first CC may include transmit data 804 and the PSFCH 806. Further, a second slot 816 on the second CC may only include the transmit data 810.

Figure 8C:
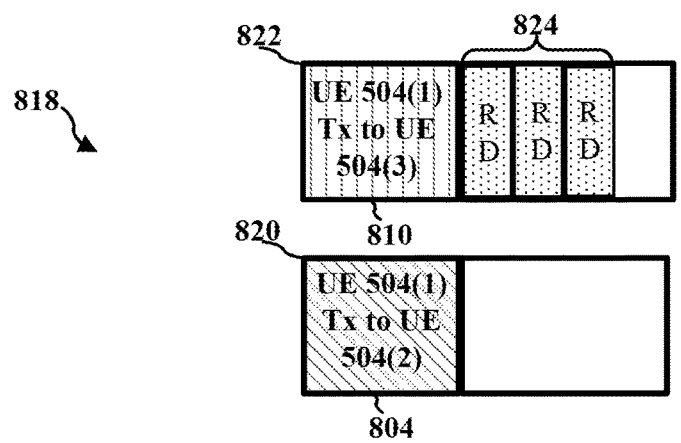
FIG. 8C is a diagram illustrating a third example position of the repeat data and/or PSFCH, in accordance with some aspects of the present disclosure.

FIG. 8C is a diagram 818 illustrating a third example position of the repeat data and/or PSFCH, in accordance with some aspects of the present disclosure. As illustrated in FIG. 8C, the first slot 820 on the first CC may include only the transmit data 804. Further, a second slot 822 on the second CC may include the transmit data 810 and the repeat data 824. Further, as illustrated in FIG. 8C, the repeat data 824 may be transmitted using three symbols given there is no PSFCH 806 in the first slot 820.

Figure 9:
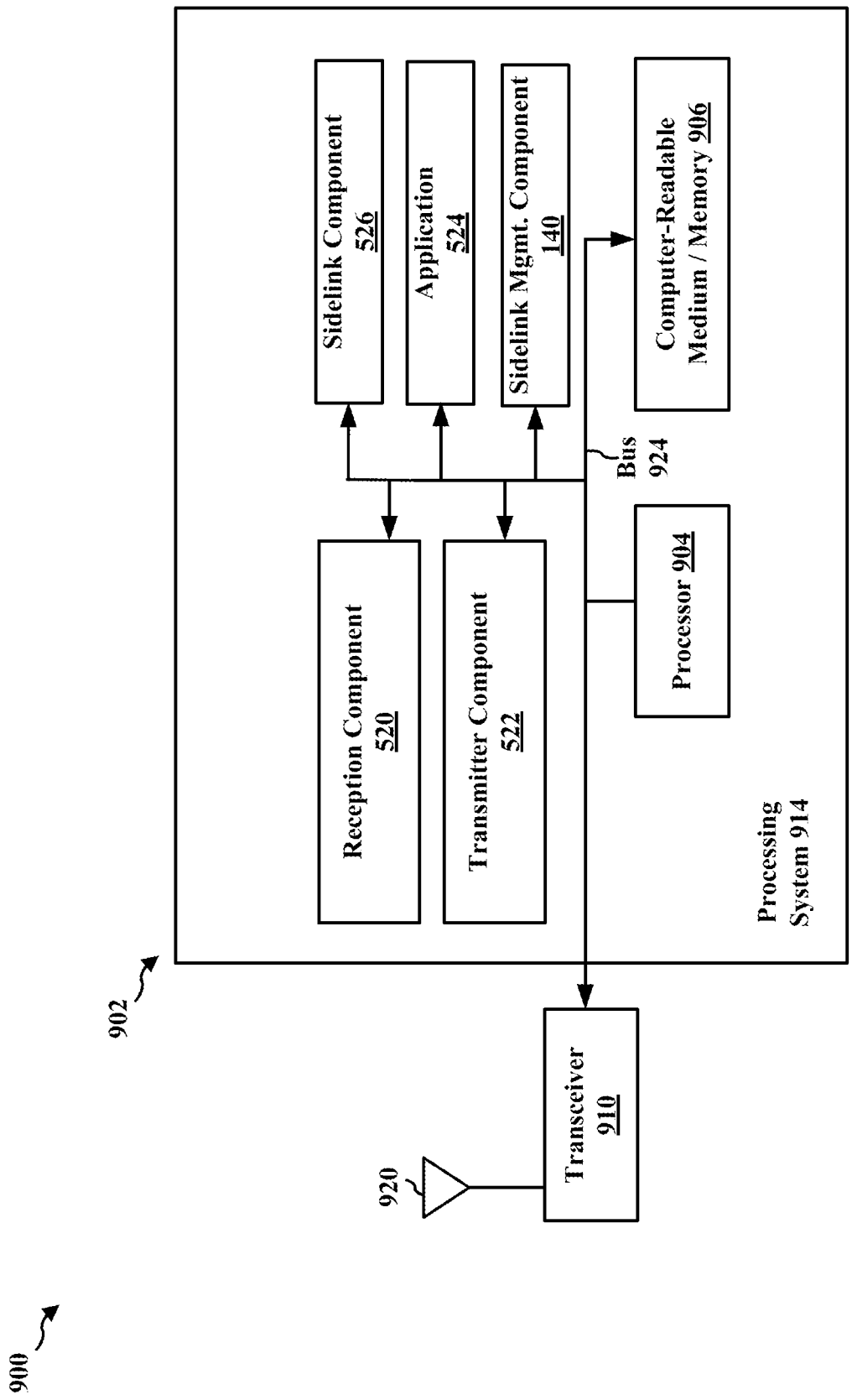
FIG. 9 is a diagram illustrating an example of a hardware implementation for a UE employing a processing system, in accordance with some aspects of the present disclosure.

FIG. 9 is a diagram 900 illustrating an example of a hardware implementation for a UE 902 (e.g., the UE 104, the UEs 504(1)-(3), etc.) employing a processing system 914. The processing system 914 may be implemented with a bus architecture, represented generally by the bus 924. The bus 924 may include any number of interconnecting buses and/or bridges depending on the specific application of the processing system 914 and the overall design constraints. The bus 924 links together various circuits including one or more processors and/or hardware components, represented by the processor 904, the sidelink management component 140, the sidelink communication component 526, and the computer-readable medium (e.g., non-transitory computer-readable medium)/memory 906. The bus 924 may also link various other circuits such as timing sources, peripherals, voltage regulators, and power management circuits, which are well known in the art, and therefore, will not be described any further.

The processing system 914 may be coupled with a transceiver 910. The transceiver 910 may be coupled with one or more antennas 920. The transceiver 910 provides a means for communicating with various other apparatus over a transmission medium. The transceiver 910 receives a signal from the one or more antennas, extracts information from the received signal, and provides the extracted information to the processing system 914, specifically the reception component 520. The reception component 520 may receive sidelink data from other UEs and the capability information 516. In addition, the transceiver 910 receives information from the processing system 914, specifically the transmitter component 522, and based on the received information, generates a signal to be applied to the one or more antennas. Further, the transmitter component 522 may transmit the transmit data 506, the transmit data 508, the repeat data 512, and the repeat data indication 514.

The processing system 914 includes a processor 904 coupled with a computer-readable medium/memory 906 (e.g., a non-transitory computer readable medium). The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the sidelink management component 140 or the sidelink communication component 526. The aforementioned components may be a software component running in the processor 904, resident/stored in the computer readable medium/memory 906, one or more hardware components coupled with the processor 904, or some combination thereof. The processing system 914 may be a component of the UE 902 and may include the memory 360 and/or at least one of the TX processor 368, the RX processor 356, and the controller/processor 359. Alternatively, the processing system 914 may be the entire UE (e.g., see 350 of FIG. 3, UE 504 of FIG. 4).

The aforementioned means may be one or more of the aforementioned components of the UE 902 and/or the processing system 914 of UE 902 configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
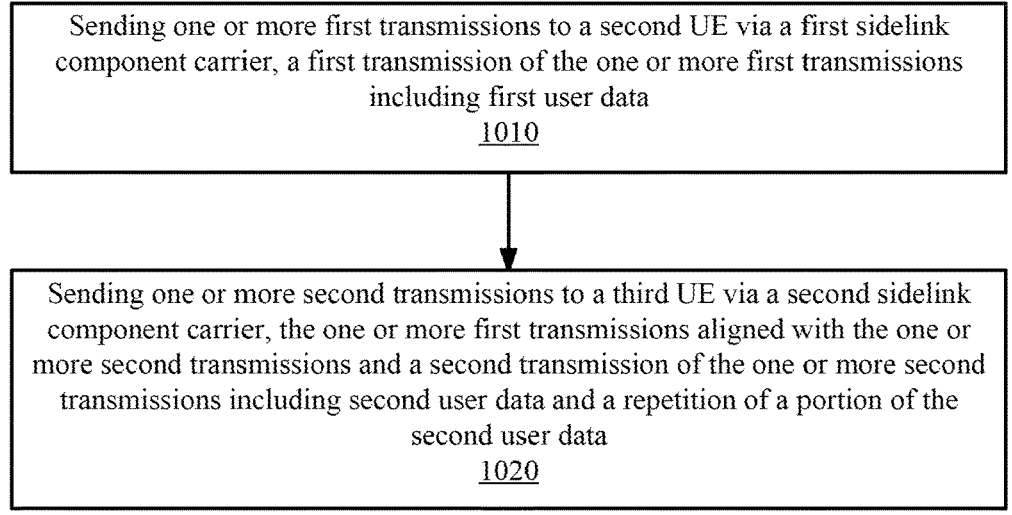
FIG. 10 is a flowchart of a first example method of aligning transmissions for intra-band carrier aggregation in sidelink communications, in accordance with some aspects of the present disclosure.

FIG. 10 is a flowchart of a method 1000 of aligning transmissions for intra-band carrier aggregation in sidelink communications. The method may be performed by a UE (e.g., the UE 104 of FIGS. 1 and 3, which may include the memory 360 and which may be the entire UE 104 or a component of the UE 104, such as the sidelink management component 140, the TX processor 368, the RX processor 356, and/or the controller/processor 359; the UE 504(1) of FIG. 5; and/or the UE 902 of FIG. 9).

At block 1010, the method 1000 may include sending one or more first transmissions to a second UE via a first sidelink component carrier, a first transmission of the one or more first transmissions including first user data. For example, the UE 504(1) may transmit the first transmit data 506(1) to the UE 504(2) in a sidelink communication.

Accordingly, the UE 104, the UE 504, UE 902, the TX processor 368, the RX processor 356, and/or the controller/processor 359, executing the sidelink management component 140 may provide means for sending one or more first transmissions to a second UE via a first sidelink component carrier, a first transmission of the one or more first transmissions including first user data.

At block 1020, the method 1000 may include sending one or more second transmissions to a third UE via a second sidelink component carrier, the one or more first transmissions aligned with the one or more second transmissions and a second transmission of the one or more second transmissions including second user data and a repetition of a portion of the second user data. For example, the UE 504(1) may transmit the second transmit data 508(1) and the repeat data 512(1) to the UE 504(3). Further, the second transmit data 508(1) may be trimmed to match the length of the first transmit data 506(1), and the repeat data may include a repetition of a portion of the first transmit data 508(1).

Accordingly, the UE 104, the UE 504, UE 902, the TX processor 368, the RX processor 356, and/or the controller/processor 359 executing the sidelink management component 140 may provide means for sending one or more second transmissions to a third UE via a second sidelink component carrier, the one or more first transmissions aligned with the one or more second transmissions and a second transmission of the one or more second transmissions including second user data and a repetition of a portion of the second user data.

FIG. 11 is a flowchart of a method 1100 of aligning transmissions for intra-band carrier aggregation in sidelink communications. The method may be performed by a UE (e.g., the UE 104 of FIGS. 1 and 3, which may include the memory 360 and which may be the entire UE 104 or a component of the UE 104, such as the sidelink communication component 526, the TX processor 368, the RX processor 356, and/or the controller/processor 359; the UE 504(3) of FIG. 5; and/or the UE 902 of FIG. 6).

At block 1110, the method 1100 may include receiving, from a second UE, a sidelink repetition indication to the UE, the sidelink repetition indication scheduling transmission of repetition information within one or more first transmissions. For example, the UE 504(3) may receive the repeat data indication 514 from the UE 504(1).

Accordingly, the UE 104, the UE 504, UE 902, the TX processor 368, the RX processor 356, and/or the controller/processor 359, executing the sidelink communication component 526 may provide means for receiving, from a second UE, a sidelink repetition indication to the UE, the sidelink repetition indication scheduling transmission of repetition information within one or more first transmissions.

At block 1120, the method 1100 may include receiving, from the second UE, the one or more first transmissions via a sidelink component carrier, the one or more first transmissions aligned with the one or more second transmissions by the second UE to a third UE, and a first transmission of the one or more first transmissions including first user data and a repetition of a portion of the first user data. For example, the UE 504(3) may receive the second transmit data 508(1) and the repeat data 512(1) from the UE 504(1). Further, the second transmit data 508(1) may be trimmed to match the length of the first transmit data 506(1), and the repeat data may include a repetition of a portion of the first transmit data 508(1).

Accordingly, the UE 104, the UE 504, UE 902, the TX processor 368, the RX processor 356, and/or the controller/processor 359 executing the sidelink communication component 526 may provide means for receiving, from the second UE, the one or more first transmissions via a sidelink component carrier, the one or more first transmissions aligned with the one or more second transmissions by the second UE to a third UE, and a first transmission of the one or more first transmissions including first user data and a repetition of a portion of the first user data.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE CLAUSES

A. A method of wireless communication at a first user equipment (UE) comprising: sending one or more first transmissions to a second UE via a first sidelink component carrier, a first transmission of the one or more first transmissions including first user data; and sending one or more second transmissions to a third UE via a second sidelink component carrier, the one or more first transmissions aligned with the one or more second transmissions and a second transmission of the one or more second transmissions including second user data and a repetition of a portion of the second user data.

B. The method as paragraph A recites, further comprising scheduling transmission of a signal or a channel after the first user data within the first transmission, wherein the repetition is transmitted using a plurality of symbols after the second user data that do not overlap with symbols used for the signal or the channel.

C. The method as paragraph B recites, wherein the signal or the channel includes a physical sidelink feedback channel (PSFCH).

D. The method as paragraph B recites, wherein the signal or the channel includes a sidelink reference signal.

E. The method as any of paragraphs A-D recite, further comprising canceling transmission of a signal or a channel after the first user data within the first transmission; wherein the repetition is transmitted using a plurality of symbols after the second user data.

F. The method as paragraph E recites, wherein the plurality of symbols include three symbols following a physical sidelink shared channel (PSSCH).

G. The method as paragraph E recites, wherein canceling the transmission of the signal or the channel comprises canceling the transmission of the signal or the channel based at least in part on a priority of the second user data or a priority of the signal or the channel.

H. The method as any of paragraphs A-G recite, further comprising sending a sidelink repetition indication to the UE, the sidelink repetition indication scheduling transmission of repetition information within the one or more second transmissions, and the repetition information includes the repetition of the portion of the second user data.

I. The method as paragraph H recites, wherein sending the sidelink repetition indication comprises determining to schedule the transmission of the repetition information based at least in part on one or more attributes of the third UE.

J. The method as any of paragraphs A-H recite, wherein a redundancy version of the repetition of the portion of second user data is equal to a redundancy version of the second user data.

K. The method as any of paragraphs A-J recite, further comprising receiving, from a network entity, resource configuration information identifying the second sidelink resource, and wherein switching the primary resource designation from the first sidelink resource to the second sidelink resource comprises switching the primary resource designation from the first sidelink resource to the second sidelink resource based at least in part on the resource configuration information.

L. The method as any of paragraphs A-J recite, wherein a redundancy version of the repetition of the portion of second user data is different from a redundancy version of the second user data.

M. The method as any of paragraphs A-L recite, wherein the repetition is a first repetition and sending the one or more second transmissions to the third UE comprises: sending, within sidelink control information of the second transmission, a redundancy value for a second repetition of a third transmission of the one or more second transmissions.

N. The method as any of paragraphs A-L recite, wherein the repetition is a first repetition, and further comprising: sending, to the third UE, repetition configuration information including a mapping for determining, from the first repetition of the second transmission, a redundancy value for a second repetition of a third transmission of the one or more second transmissions.

O. The method as any of paragraphs A-N recite, wherein the repetition includes a portion of sidelink control information symbols and a physical sidelink shared channel (PSSCH) of the second transmission.

P. The method as any of paragraphs A-N recite, wherein the repetition includes a portion of the second user data and/or sidelink control information (SCI) 2.

Q. The method as any of paragraphs A-P recite, wherein the repetition is a first repetition, further comprising: determining whether to receive data on a physical sidelink feedback channel (PSFCH) or transmit a second repetition of a physical sidelink shared channel (PSSCH) of a third transmission based at least in part on comparing a priority of the PSFCH to a priority of the PSSCH.

R. The method as any of paragraphs A-Q recite, wherein the UE is a 5G NR wireless equipment device.

S. A user equipment for wireless communication, comprising a memory storing computer-executable instructions; and at least one processor coupled with the memory and configured to execute the computer-executable instructions to perform the method of any of paragraphs A-R.

T. A user equipment for wireless communication, comprising means for performing the method of any of paragraphs A-R.

U. A non-transitory computer-readable medium storing computer executable code, the code when executed by a processor causes the processor to perform the method of any of paragraphs A-R.

W. A method of wireless communication at a first UE, comprising: receiving, from a second UE, a sidelink repetition indication to the UE, the sidelink repetition indication scheduling transmission of repetition information within one or more first transmissions; and receiving, from the second UE, the one or more first transmissions via a sidelink component carrier, the one or more first transmissions aligned with the one or more second transmissions by the second UE to a third UE, and a first transmission of the one or more first transmissions including first user data and a repetition of a portion of the first user data.

X. The method as paragraph W recites, wherein the repetition is received contemporaneously with receipt of a physical sidelink feedback channel (PSFCH) at the third UE.

Y. The method as paragraph W recites, wherein the repetition is received over three symbols following a physical sidelink shared channel (PSSCH).

Z. The method as paragraph W recites, wherein the repetition includes a portion of sidelink control information symbols and a physical sidelink shared channel (PSSCH) of the second transmission.

AA. The method as paragraph W recites, wherein the repetition includes a portion of the second user data and/or sidelink control information (SCI) 2.

Z. The method as any of paragraphs W-Z recite, wherein the first UE is a 5G NR wireless equipment device.

AA. A user equipment for wireless communication, comprising a memory storing computer-executable instructions; and at least one processor coupled with the memory and configured to execute the computer-executable instructions to perform the method of any of paragraphs W-AA.

AB. A user equipment for wireless communication, comprising means for performing the method of any of paragraphs W-AA.

AC. A non-transitory computer-readable medium storing computer executable code, the code when executed by a processor causes the processor to perform the method of any of paragraphs W-AA.

What is claimed is:

1. A method of wireless communication at a first user equipment (UE) comprising:
    sending one or more first transmissions to a second UE via a first sidelink component carrier, a first transmission of the one or more first transmissions including first user data; and
    sending one or more second transmissions to a third UE via a second sidelink component carrier, the one or more first transmissions aligned with the one or more second transmissions and a second transmission of the one or more second transmissions including second user data and a repetition of a portion of the second user data.

2. The method of claim 1, further comprising:
    scheduling transmission of a signal or a channel after the first user data within the first transmission, wherein the repetition is transmitted using a plurality of symbols after the second user data that do not overlap with symbols used for the signal or the channel.

3. The method of claim 2, wherein the signal or the channel includes a physical sidelink feedback channel (PSFCH).

4. The method of claim 2, wherein the signal or the channel includes a sidelink reference signal.

5. The method of claim 1, further comprising:
    canceling transmission of a signal or a channel after the first user data within the first transmission;
    wherein the repetition is transmitted using a plurality of symbols after the second user data.

6. The method of claim 5, wherein the plurality of symbols include three symbols following a physical sidelink shared channel (PSSCH).

7. The method of claim 5, wherein canceling the transmission of the signal or the channel comprises canceling the transmission of the signal or the channel based at least in part on a priority of the second user data or a priority of the signal or the channel.

8. The method of claim 1, further comprising sending a sidelink repetition indication to the third UE, the sidelink repetition indication scheduling transmission of repetition information within the one or more second transmissions, and the repetition information includes the repetition of the portion of the second user data.

9. The method of claim 8, wherein sending the sidelink repetition indication comprises determining to schedule the transmission of the repetition information based at least in part on one or more attributes of the third UE.

10. The method of claim 1, wherein a redundancy version of the repetition of the portion of second user data is equal to a redundancy version of the second user data.

11. The method of claim 1, wherein a redundancy version of the repetition of the portion of second user data is different from a redundancy version of the second user data.

12. The method of claim 1, wherein the repetition is a first repetition and sending the one or more second transmissions to the third UE comprises:
    sending, within sidelink control information of the second transmission, a redundancy value for a second repetition of a third transmission of the one or more second transmissions.

13. The method of claim 1, wherein the repetition is a first repetition, and further comprising:
    sending, to the third UE, repetition configuration information including a mapping for determining, from the first repetition of the second transmission, a redundancy value for a second repetition of a third transmission of the one or more second transmissions.

14. The method of claim 1, wherein the repetition includes a portion of sidelink control information symbols and a physical sidelink shared channel (PSSCH) of the second transmission.

15. The method of claim 1, wherein the repetition includes a portion of the second user data and/or sidelink control information (SCI) 2.

16. The method of claim 1, wherein the repetition is a first repetition, further comprising:
    determining whether to receive data on a physical sidelink feedback channel (PSFCH) or transmit a second repetition of a physical sidelink shared channel (PSSCH) of a third transmission based at least in part on comparing a priority of the PSFCH to a priority of the PSSCH.

17. A first user equipment (UE) for wireless communication, comprising:
    a memory storing computer-executable instructions; and
    at least one processor coupled with the memory and configured to execute the computer-executable instructions to:
        send one or more first transmissions to a second UE via a first sidelink component carrier, a first transmission of the one or more first transmissions including first user data; and
        send one or more second transmissions to a third UE via a second sidelink component carrier, the one or more first transmissions aligned with the one or more second transmissions and a second transmission of the one or more second transmissions including second user data and a repetition of a portion of the second user data.

18. The first UE of claim 17, wherein the at least one processor is further configured to:
    schedule transmission of a signal or a channel after the first user data within the first transmission, wherein the repetition is transmitted using a plurality of symbols after the second user data that do not overlap with symbols used for the signal or the channel.

19. The first UE of claim 18, wherein the signal or the channel includes a physical sidelink feedback channel (PSFCH).

20. The first UE of claim 19, wherein the plurality of symbols include three symbols following a physical sidelink shared channel (PSSCH).

21. The first UE of claim 17, wherein the at least one processor is further configured to:
cancel transmission of a signal or a channel after the first user data within the first transmission;
wherein the repetition is transmitted using a plurality of symbols after the second user data.

22. The first UE of claim 17, wherein the at least one processor is further configured to:
send a sidelink repetition indication to the third UE, the sidelink repetition indication scheduling transmission of repetition information within the one or more second transmissions, and the repetition information includes the repetition of the portion of the second user data.

23. The first UE of claim 17, wherein the repetition includes a portion of sidelink control information symbols and a physical sidelink shared channel (PSSCH) of the second transmission.

24. The first UE of claim 17, wherein the repetition includes a portion of the second user data and/or sidelink control information (SCI) 2.

25. A method of wireless communication at a first user equipment (UE), comprising:
receiving, from a second UE, a sidelink repetition indication to the first UE, the sidelink repetition indication scheduling transmission of repetition information within one or more first transmissions; and
receiving, from the second UE, the one or more first transmissions via a sidelink component carrier, the one or more first transmissions aligned with one or more second transmissions by the second UE to a third UE, and a first transmission of the one or more first transmissions including first user data and a repetition of a portion of the first user data.

26. The method of claim 25, wherein the repetition is received contemporaneously with receipt of a physical sidelink feedback channel (PSFCH) at the third UE.

27. The method of claim 25, wherein the repetition is received over three symbols following a physical sidelink shared channel (PSSCH).

28. The method of claim 25, wherein the repetition includes a portion of sidelink control information symbols and a physical sidelink shared channel (PSSCH) of the second transmission.

29. The method of claim 25, wherein the repetition includes a portion of the second user data and/or sidelink control information (SCI) 2.

30. A first user equipment (UE) for wireless communication, comprising:
a memory storing computer-executable instructions; and
at least one processor coupled with the memory and configured to execute the computer-executable instructions to:
receive, from a second UE, a sidelink repetition indication to the first_UE, the sidelink repetition indication scheduling transmission of repetition information within one or more first transmissions; and
receive, from the second UE, the one or more first transmissions via a sidelink component carrier, the one or more first transmissions aligned with one or more second transmissions by the second UE to a third UE, and a first transmission of the one or more first transmissions including first user data and a repetition of a portion of the first user data.

* * * * *